United States Patent [19]

Goebel

[11] Patent Number: 4,458,532

[45] Date of Patent: Jul. 10, 1984

[54] METHOD AND APPARATUS FOR DETERMINING AND INDEXING THE ANGULAR LOCATION OF UNBALANCE OF A ROTATING BODY

[75] Inventor: Eickhart Goebel, Pfungstadt, Fed. Rep. of Germany

[73] Assignee: Gebr. Hofmann GmbH & Co. KG. Maschinenfabrik, Darmstadt, Fed. Rep. of Germany

[21] Appl. No.: 368,767

[22] Filed: Apr. 15, 1982

[30] Foreign Application Priority Data

Jun. 19, 1981 [DE] Fed. Rep. of Germany ....... 3124248

[51] Int. Cl.³ .............................................. G01M 1/14
[52] U.S. Cl. ................................................... 73/462
[58] Field of Search ........................................... 73/462

[56] References Cited

U.S. PATENT DOCUMENTS

| | | | |
|---|---|---|---|
| 3,835,712 | 9/1974 | Muller | 73/462 |
| 4,062,242 | 12/1977 | Brihier | 73/462 |
| 4,155,255 | 5/1979 | Sherman et al. | 73/462 |
| 4,162,634 | 7/1979 | Hofmann | 73/462 |
| 4,201,091 | 5/1980 | Guyot et al. | 73/462 |

Primary Examiner—James J. Gill
Attorney, Agent, or Firm—Fleit, Jacobson, Cohn & Price

[57] ABSTRACT

A method and apparatus for determining and indexing the angular location of unbalance of a rotatable body. Such unbalance is determined by mounting the body on a balancing machine and rotating the body to obtain an unbalance measurement. The method and apparatus provide for the subsequent rotation of the body to a correction position over the shortest possible distance.

14 Claims, 2 Drawing Figures

METHOD AND APPARATUS FOR DETERMINING AND INDEXING THE ANGULAR LOCATION OF UNBALANCE OF A ROTATING BODY

BACKGROUND OF THE INVENTION

The invention relates to a method and an apparatus for determining and indexing the angular location of unbalance of a rotatable body. More particularly, the invention relates to a method and apparatus for determining unbalance in a rotating body and for indexing the body to a correction position over the shortest possible distance.

DESCRIPTION OF THE PRIOR ART

German Patent DE-PS No. 2,643,962 describes an apparatus for balancing a wheel, in which the unbalance present in the wheel is to be measured and stored relative to a shaft carrying the wheel. The shaft and wheel are rigidly connected to each other and set into rotation together. Two indicators show the direction of rotation in which the unbalance of the wheel is to be indexed to the correction position over the shortest distance. Another indicator shows when the correction position is reached. The apparatus is further provided with an angle coding device generating a series of binary code numbers, with each code number conforming to a predetermined angular location of the wheel.

One of the disadvantages of this apparatus is obviously the expensive angle coding device and the respective reading unit, which increases the price of such a balancing machine considerably. Furthermore, these parts are quite susceptible to malfunctions and often do not meet the hard requirements encountered during use in garages.

Further, it is known from U.S. Pat. No. 4,062,242 to provide a coding disc keyed on a shaft in a machine for balancing vehicle wheels.

SUMMARY OF THE INVENTION

Therefore, it is an object of the present invention to provide a method and apparatus for determining and indexing the angular location of unbalance of rotating bodies during unbalance measurement on balancing machines, which ensure safe, trouble-free and economic operation.

With the apparatus and the method of the present invention, it is quite easy to determine the angular location of the unbalance of a rotating body, and to index the body subsequently over the shortest distance to a respective correction position. Indexing is carried out either manually or automatically.

The numerical values being preset at the beginning of the forward and backward counts, the contrary count at the cutting off of the drive of the balancing machine ensures that the sum of the complementary numbers is always equal. As a result, during the indexing run carried out after measurement, the stored angular location of unbalance can be indexed to the predetermined correction position.

The counter being set to predetermined values, it is also possible to compensate for mechanical errors, which might cause a phase shift. Furthermore, the rotating body can be indexed to a suitable and ergonomically favorable correction position after the measuring run.

In a presently preferred embodiment, the counter is set to zero at the beginning of the forward count, and to fifty at the beginning of the backward count, with one hundred impulses being created per revolution of the rotating body.

Comparison of the sum of the stored amount conforming to the angular location of unbalance and the amount conforming to the instantaneous location, with the amount conforming to half a revolution of the rotating body, permits indexing of the rotating body over the shortest distance to the predetermined correction position, with the direction of rotation being read out on display devices or meters.

Another embodiment of the invention permits to count backwards from zero instead of from the amount representative of half the revolution of the rotating body. In this case and on the condition that everything else remains unchanged, the angular location of unbalance is indexed to a correction position directly opposite the previously mentioned position.

In a third embodiment, the location of unbalance is again indexed to the first correction position, even with the backward count starting from zero, if the storage releasing impulse is shifted by 180 degrees by making use of the second zero passage of the unbalance vibration.

The invention, and its objects and advantages, will become more apparent in the detailed description of the preferred embodiment hereinafter presented.

BRIEF DESCRIPTION OF THE DRAWINGS

One embodiment of the present invention is illustrated in the accompanying drawings, in which.

DESCRIPTION OF THE PREFERRED EMBODIMENT

The present description will be directed in particular to elements forming part of, or cooperating more directly with, the present invention. Elements not specifically shown or described herein are understood to be selectable from those known in the art.

Figure 1:
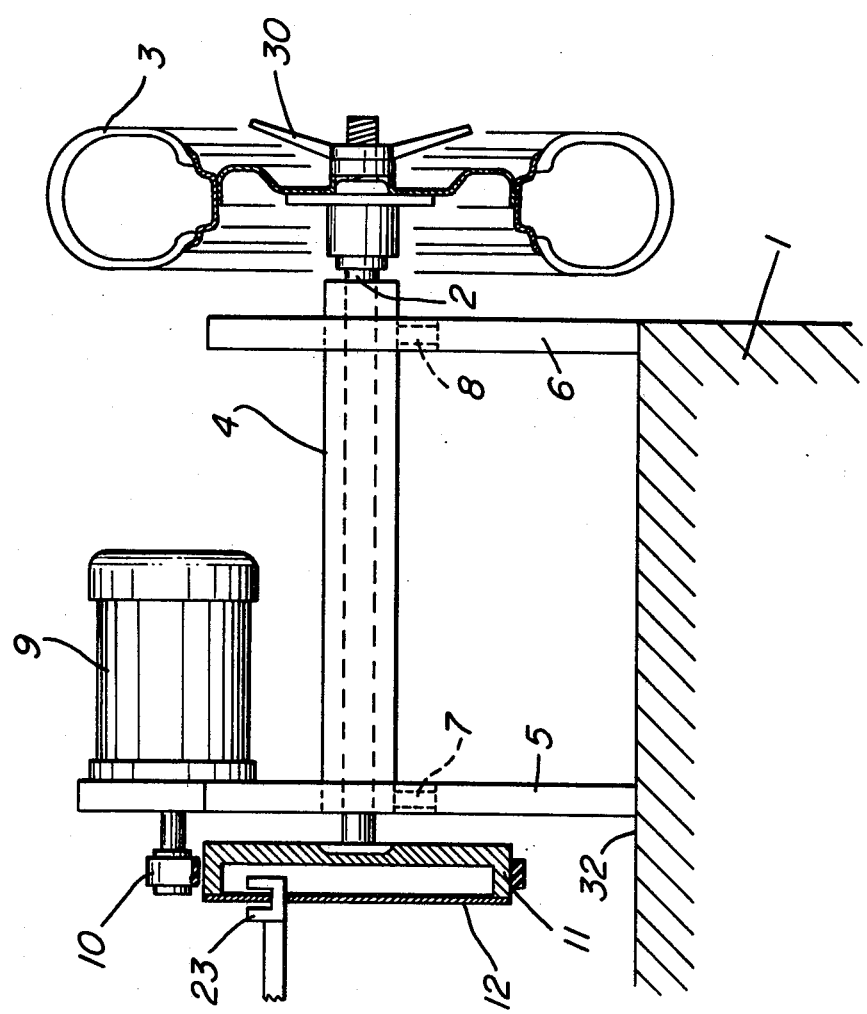
FIG. 1 is a schematic diagram of one embodiment of the inventive balancing apparatus.
Figure 2:
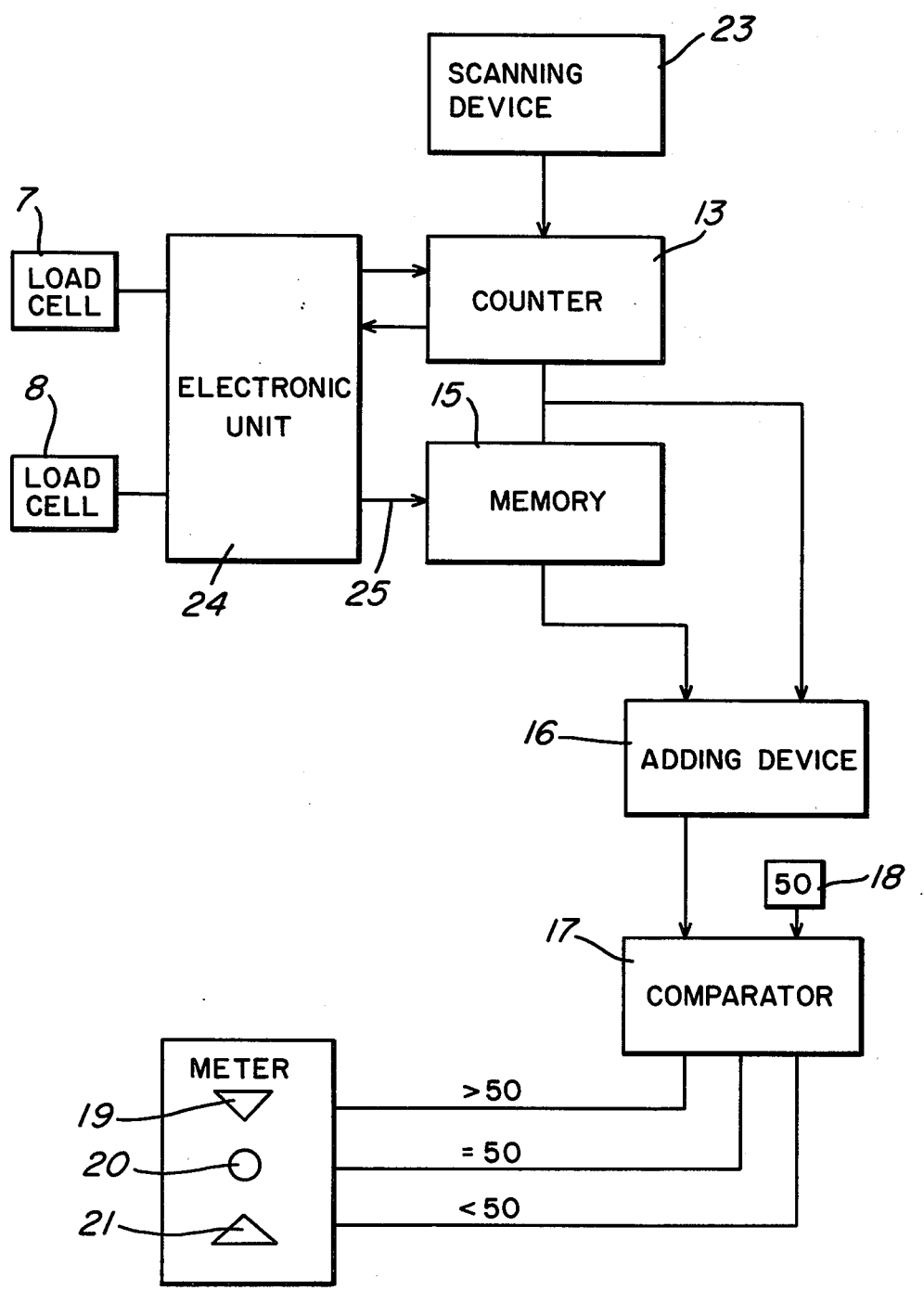
FIG. 2 is a block circuit diagram usable with the apparatus of FIG. 1 for determination of the angular location of unbalance.

A balancing machine 1, for instance a machine of the type described in U.S. Pat. No. 3,835,712 is schematically illustrated in FIG. 1. The machine 1 is provided with a spindle 2 on which a rotating body 3, in this case an automobile wheel, is clamped by a clamping device 30. The spindle 2 is rotatably supported in ball bearings (not illustrated) provided in the bearing housing 4, the both extremities of which are fixed on the supports 5 and 6. The supports 5 and 6, in turn, are welded on the machine housing 32. The supports 5 and 6 serve as parallel guides and supports for the housing 4. Load cells 7 and 8 are interposed between the supports and the housing, and preferably, are responsive in the vertical plane of the spindle 2. Suitable load cells are force measuring transducers that sense deflection of spindle 2 resulting from unbalances in the rotating body 3. Drive of spindle 2 is by means of motor 9 and belt drive unit 10. The driving motor 9 is provided directly on one of the supports 5 and 6, thus preventing any interferences due to the belt drive from affecting the measured results.

An incremental transducer is comprised of slotted disc 12, which is fixed to the belt pulley 11, and scanning device 23. The slotted disc 12 preferably is provided with one hundred slots. Any other number of slots, such as 64, 128, or any other suitable number can also be used, depending on the accuracy required.

One slot on disc 12 might be longer than the others to serve as zero reference, but any other scanning impulse or an overflow system of the counter can also be used to control the counter 13.

The scanning device 23 is an opto-electronic device or any other unit of known type operating, for example, on inductive systems.

The output data of the transducers 7 and 8 are passed to the electronic unit 24, which determines the magnitude of unbalance relative to the two correction planes of the rotating body 3, for instance, in the manner described in U.S. Pat. No. 4,162,634.

Upon the start of the balancing machine, the counter 13 is reset preferably to zero by means of an impulse of the scanning device 23 or by the zero reference. Then the counter counts up to one hundred per revolution and is subsequently reset to zero.

The overflow system of the counter 13, which is preferably connected to the electronic measuring unit 24, is used for control of the measuring time. Satisfactory accuracy is achieved in one embodiment when thirty-two revolutions are analyzed for determination of the amount and location of unbalance per correction plane.

The data of the counter are passed to memory 15. At the zero passage of the sinusoidal unbalance vibration, the memory 15 is released by means of the storage releasing impulse from the electronic unit 24, and the value provided by the counter 13 is stored.

Upon the manual or automatic cutting off of the balancing machine, which is preferably controlled by the resetting impulses of the counter, the counter, in one embodiment, is reset to fifty, and then starts to count backwards from fifty.

The counter can also count backwards from zero or one hundred. In this case, the memory 15, however, is preferably released by the second zero passage of the sinusoidal unbalance vibration 180 degrees out of phase.

After deceleration of the balancing machine, the angular location of unbalance is indexed to the correction position either manually or automatically.

So as to recognize if the rotating body turns forward or backward, two spaced apart scanning devices 23 (only one of which is illustrated) are provided to emit impulses shifted a fraction of a pulse width with regard to each other. This is to ensure clear determination of the direction of rotation of the rotating body 3.

Both the angular location of unbalance stored in the memory 15 and the instantaneous location of the rotating body 3 are passed to the adding device 16 and added.

The last two digits of the sum added in the device 16 are passed to the comparator 17. The hundreds are separated through the overflow system.

The comparator 17 compares the value entered by the adding device 16 with a preset value set in device 18, preferably the amount of half the revolution of the rotating device, i.e., fifty in the preferred embodiment.

The following table makes obvious that indexing over the shortest distance and achieving of the correction position can actually be indicated thanks to adding the stored angular location of unbalance and the instantaneous location, and the subsequent comparison of this result with the amount conforming to half the revolution of the rotating body 3. The table assumes a measured value of "96".

| Location stored during measurement | Instant location during indexing | Sum | Compared with "50" |
|---|---|---|---|
| 90 | 60 | | |
| 91 | 59 | | |
| 92 | 58 | | |
| 93 | 57 | 1 53 | > |
| 94 | 56 | 1 52 | > |
| 95 | 55 | 1 51 | > |
| 96 | 54 | 1 50 | = |
| 97 | 53 | 1 49 | < |
| 98 | 52 | 1 48 | < |
| 99 | 51 | 1 47 | < |
| 00 | 50 | | |
| 01 | 49 | | |
| 02 | 48 | | |
| 03 | 47 | | |

In the above example, the counter reading is "0" at the beginning of the measuring run, and "50" at the beginning of the backward count. As already mentioned, it is also possible to select other data to adapt the balancing machine to certain conditions or to compensate for tolerances.

The outputs of the comparator 17 control the meters 19 to 21, with the two outside meters 19 and 21 showing the direction in which the rotating body 3 has to be indexed to reach the correction position over the shortest distance.

When the correction position is reached, i.e., when the sum of the stored value and the instantaneous location of the wheel conform to the preset value "50", the middle meter 20 will light up.

The data for the two correction planes are read out on the same meters one after the other. It is, however, also possible to provide separate meters 19 to 21 for each correction plane. Consequently, there would be a requirement for an additional memory 15, an adding device 16, and a comparator 17.

Previously, a specific embodiment of the present invention has been described. It should be appreciated, however, that such embodiment has been described for the purposes of illustration only, without any intention of limiting the scope of the present invention. Rather, it is the intention that the present invention be limited only by the appended claims.

What is claimed is:

1. A method of determining and indexing the angular location of unbalance of a rotating body during an unbalance measurement on a balancing machine provided with an incremental position transducer and a counter which is reset by each revolution of the rotating body, a memory for storing the count representative of the angular location of unbalance, and a comparator for comparing the instantaneous location of the rotating body with the stored location of unbalance, and a meter for indicating the direction of rotation of the rotating body to be indexed to the correction position, said method comprising:
   setting the counter to a numerical value conforming to approximately half a revolution of the rotating body at the beginning of the backward count;
   operating the counter to count backward at the end of an unbalance measuring run;
   entering the sum of the stored count representative of the unbalance location and the count representative of the instantaneous location of the rotating body into the comparator;

comparing the sum entered into the comparator with a value representative of one half revolution of the body; and displaying the results of such comparison so as to indicate the direction in which the body should be moved so that the angular position of the unbalance of the rotating body is indexed.

2. Method according to claim 1, in which the method includes setting a numerical value in the counter at the beginning of both forward and the backward counts.

3. Method according to claim 1, in which the method includes controlling cutting off of the drive of the balancing machine by a resetting impulse of the counter.

4. Method according to claim 1, including reading out the angular locations of the unbalances of the correction planes available on the same meter one after the other.

5. Apparatus for determining and indexing the angular location of the unbalance of a rotating body during an unbalance measurement on a balancing machine, said apparatus comprising: means for sensing unbalance of a rotating body, transducer means for providing an output signal in response to rotation of the rotating body, a counter responsive to said output signal for providing a count of the revolutions of said rotating body and for providing a numerical signal representative of an angular position of the rotating body, a memory for receiving numerical signals from said counter, an adding device which provides an output signal representing the sum of a numerical signal representative of the angular location of the unbalance of the rotating body and a numerical signal representative of the instantaneous angular position of the rotating body, a comparator connected to the adding device for comparing the output signal from the adding device with a preselected numerical value conforming to approximately half the revolution of the rotating body and for providing an output signal, and an indicating meter responsive to the output signal from said comparator to indicate the direction in which the body should be moved so that the angular position of the unbalance of the rotating body is indexed.

6. Apparatus according to claim 5, wherein said indicating meter further comprises three indicators, a first indicator responsive to said comparator output signal when said adding device output is greater than the preselected numerical value, a second indicator responsive to said comparator output signal when said adding device output is less than the preselected numerical value, and a third indicator responsive to said comparator output signal when said adding device output is equal to the preselected numerical value.

7. Apparatus according to claim 6, in which the transducer means is provided on a balancing spindle forming part of a balancing device.

8. Apparatus according to claim 7, in which the transducer means comprises one slotted disc and at least one scanning device.

9. Apparatus according to claim 7 or 8, in which the transducer means generates 100 impulses per revolution for the counter.

10. Apparatus according to claim 6, in which the counter is reset to its starting point by an arbitrary scanning impulse of the transducer means.

11. Apparatus according to claim 6, in which the counter is reset to its starting point by a zero reference of the transducer means.

12. Apparatus according to claim 6, comprising two spaced apart scanning devices for emitting impulses shifted a fraction of a pulse width with regard to each other in order to detect the direction of rotation of the rotating body.

13. Apparatus according to claim 6, in which the adding device is provided with an overflow system so that only a predetermined number of digits is passed to the comparator.

14. Apparatus according to claim 13, in which the overflow system of the counter is connected to an electronic measuring unit, the signals of which are used to control one of the counter and the measuring time.

* * * * *